Figure 1:
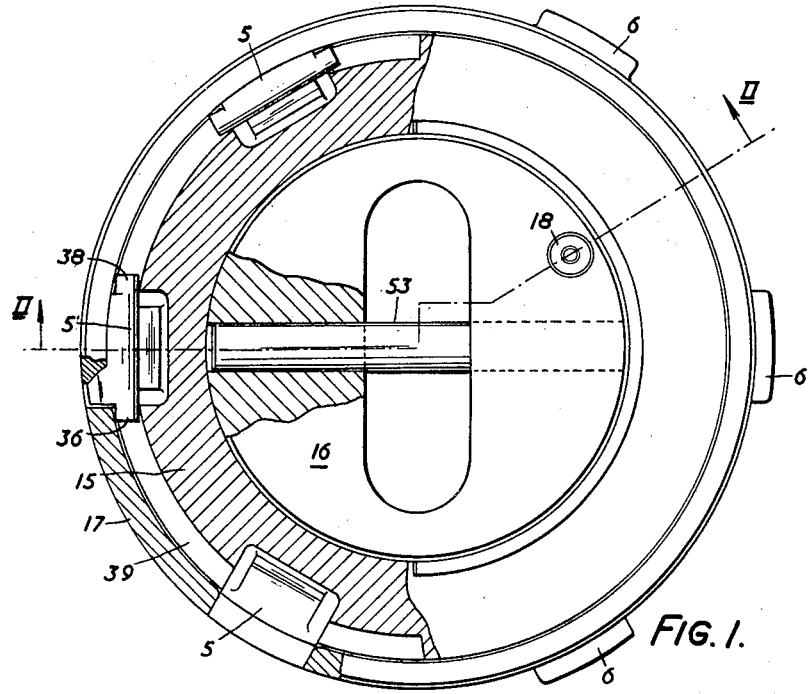

April 7, 1964     H. W. NORTON     3,128,009
CLOSURE MEANS FOR PRESSURE VESSELS
Filed Jan. 22, 1960     2 Sheets-Sheet 1

INVENTOR
H. W. Norton
BY
ATTORNEYS

April 7, 1964 H. W. NORTON 3,128,009
CLOSURE MEANS FOR PRESSURE VESSELS
Filed Jan. 22, 1960 2 Sheets-Sheet 2

INVENTOR
H. W. Norton
BY
*Holcombe, Wetherill & Brisebois*
ATTORNEYS 3,128,009
CLOSURE MEANS FOR PRESSURE VESSELS
Harry William Norton, Sutton Coldfield, England, assignor to Geartight Unions Limited, Ponders End, England, a company of Great Britain
Filed Jan. 22, 1960, Ser. No. 4,036
Claims priority, application Great Britain Jan. 28, 1959
8 Claims. (Cl. 220—55.3)

This invention relates to closure means for pressure vessels, that is to say vessels which in use are subject to a positive internal pressure, and is of particular application to closure plugs for standpipes leading to such vessels.

It is frequently necessary to seal pressure vessels with readily removable and replaceable closure means, an example being the sealing of standpipes leading to the inner space of a nuclear reactor. This space is at both high temperature and high pressure, and the standpipes provide access for changing fuel elements and carrying out various adjustments. Hitherto, closure plugs for this purpose have commonly embodied locking means which have to be actuated manually after inserting the plugs, these locking means cooperating with ball members which engage in grooves in the standpipe to oppose the internal reactor pressure and lock the plugs in position.

The object of the invention is to provide closure means for a pressure vessel which will be self-locking when fitted to hold them in position against positive pressure within the vessel in such a manner that they cannot be removed until the pressure differential across them is relieved.

According to the invention closure means for a pressure vessel comprise a plurality of portions capable of limited relative movement in a direction substantially axial of the opening to be closed, an external force being applied to a first of these portions during both fitting and removal of the closure means and a pressure difference across the closure means when fitted acting on a second of the portions, and a plurality of cam members angularly separated with respect to said axial direction and carried by one of the portions other than said second portion so that, when the portions are fully apart, the cam members clear the wall of the opening but, as the portions move towards each other during fitting, move laterally outwards for engagement with a cam-engaging formation of said wall and are then locked in engagement therewith by a locking shoulder or shoulders brought into position by further movement of the portions towards each other, the action of said pressure difference on said second portion serving to urge the locking shoulder or shoulders axially outwards so that the closure means cannot be removed by the application of said external force until said pressure difference is relieved.

The cam-engaging formation may comprise a locking recess or series of locking recesses formed in the wall of the opening and preferably the cam members are pivotally mounted on the first portion, which is conveniently the outermost portion, for swinging movement laterally outwards to bring them into engagement with the recess or recesses. Alternatively, the cam members may be carried by the first portion and mounted for sliding movement relatively thereto, such sliding movement having a lateral component to bring the members into engagement with the recess or recesses. Said second portion may be the innermost portion which preferably seals against the wall of the opening.

Preferably the innermost portion is arranged to seat in the opening, when the portions are fully apart, the locking recess or recesses being so disposed relatively to the seating and of such width that as the portions move together the cam members can move laterally outwards with clearance into the recess or recesses to enable the locking shoulder or shoulders to move into locking position. With such an arrangement the width of the locking recess or recesses will provide freedom of movement between the latter and the cam members in a direction axial of the opening, and the normal working pressure within the vessel conveniently acts to displace the closure means bodily outwards to trap the cam members between the outer edge surfaces of the locking recess or recesses and an abutment surface on the innermost portion.

Preferably the cam members have a profile complementary to the outer edge profile of the locking recess or recesses, so that substantial surface locking contact is obtained.

A single locking shoulder is conveniently provided for all the cam members and may be formed on said second portion in which case only two of said portions need be provided, or it may be formed on a third or intermediate portion disposed between said first and second portions in which case only these three portions need be provided. The three portions may engage telescopically with the intermediate portion providing a lost motion connection between the inner and outer portions to provide said limited degree of relative movement. A cam surface on the intermediate portion may engage the cam members as the portions move apart to move the cam members laterally inwards to a position in which they clear the wall of the opening. When the cam members are slidably mounted on the first portion the latter may itself be formed with a cam surface or surfaces for engagement with the cam members to produce their lateral movement.

When the opening to be sealed is circular, so that the closure means is of circular form, the cam members preferably engage in a single annular locking recess, and with such an arrangement angular alignment of the closure means relatively to the opening is unnecessary. The locking shoulder, especially when the cam members are pivotally mounted, is conveniently disposed radially outwardly of an inclined cam surface and may be continuous therewith, this cam surface being arranged to displace the cam members laterally outwards into engagement with the locking recess as the portions move together.

The closure means, when adapted to seal a substantially horizontal upwardly directed opening such as the upper end of a vertical standpipe, preferably utilise gravity to move the portions together during fitting. Thus, the closure means may be suspended by the outermost portion and lowered into position in the opening until the innermost portion seats therein, though if desired the arrangement may be such that a force additional to its own weight is necessary to seat the innermost portion. Continued lowering of the outermost portion causes the cam members to move laterally outwards into engagement with the locking recess whereupon the locking shoulder moves its locking position.

When used for sealing openings not upwardly directed and horizontal, it may be necessary to use a spring or other bias for producing relative movement of the portions and/or movement of the cam members to replace and/or oppose gravitational forces.

It will be apparent that once the closure means have been fitted and an internal pressure built up sufficient to displace them bodily outwards to trap the cam members in the aforesaid manner, the closure means cannot be removed until the pressure difference across them has been relieved to allow the innermost portion to return to its seating. This is a most important safety feature, especially when the closure means are used with nuclear reactors where any escape of the fluid being sealed might produce a dangerous hazard.

A sealing ring seated in a groove in the innermost portion may be used to seal the latter relatively to the opening wall, and a plurality of axially spaced sealing rings may be used an outer one of which is seated in an oversize groove which can be used as a sampling annulus to detect any leakage as far as this groove. For high temperature applications a suitable form of metallic seal may alternatively be used.

The portions may be formed to allow a clear space through the centre of the closure means through which remote handling or other equipment can pass into the pressure vessel, this equipment being itself suitably sealed relatively to the closure means.

Figure 2:
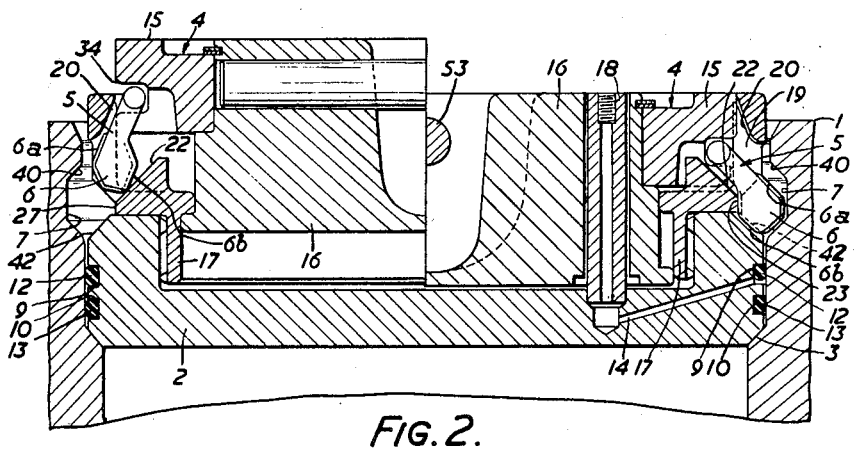
Figure 3:
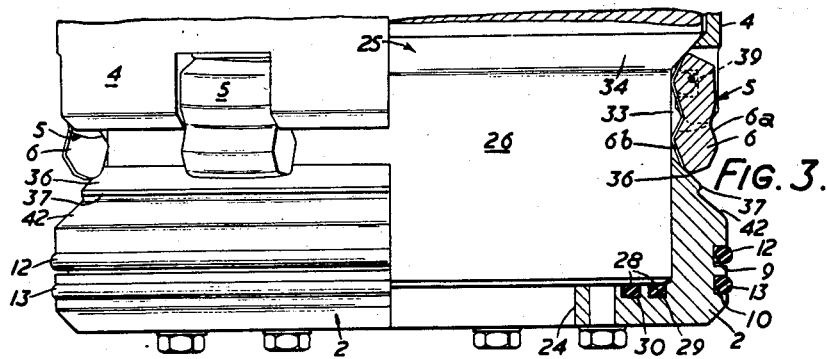
Figure 4:
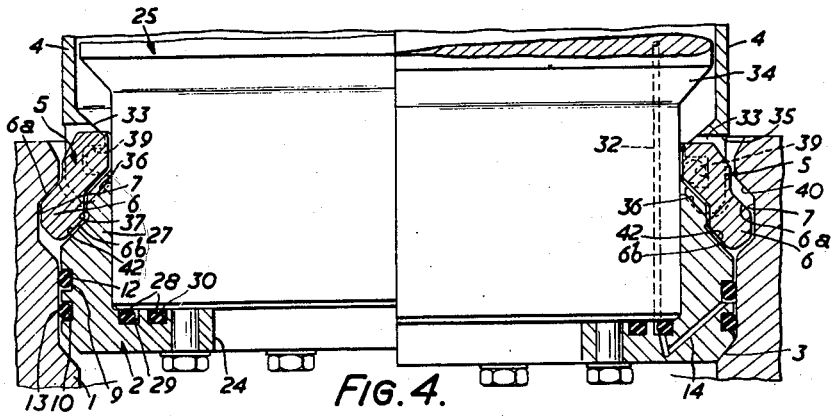
Figure 6:
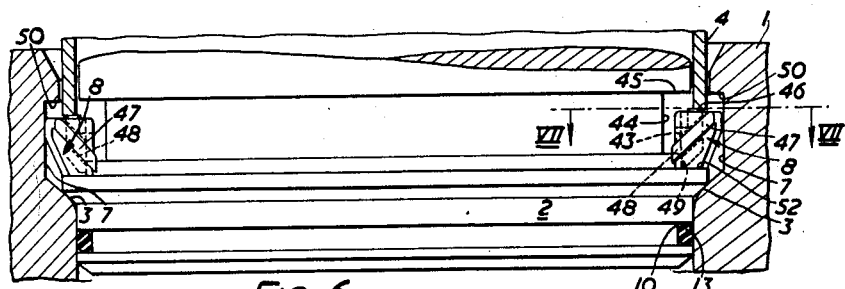
Figure 5:
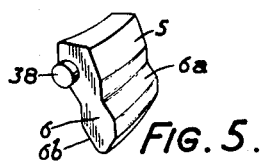
Figure 7:
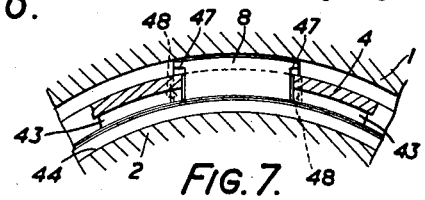

The invention will now be further described with reference to the accompanying drawings which illustrate, by way of example, three embodiments of the invention, and in which:

FIGURE 1 is a part-sectioned plan view of one of the embodiments,

FIGURE 2 is an axial cross-sectional view of the same embodiment in position within a standpipe, showing the parts in both the locked position and their position prior to locking, on the line II—II in FIGURE 1, FIGURE 3 is a part-sectioned side view of another of the embodiments, FIGURE 4 is a view generally similar to FIGURE 2 of the embodiment of FIGURE 3 showing the parts both initially locked and as locked under pressure within the standpipe, FIGURE 5 is a detail view of this embodiment, FIGURE 6 is an axial cross-sectional view of the third embodiment shown in locked position within a standpipe, and FIGURE 7 is a fragmentary sectional view on the line VII—VII in FIGURE 6.

All three of the embodiments illustrated are closure plugs suitable for sealing the upper ends of vertical standpipes such as 1 or other substantially horizontal upwardly directed openings and comprise a lower or inner circular portion 2 adapted to seat on an internal shoulder 3 in the wall of the opening and an upper or outer circular portion 4 capable of a limited degree of relative axial movement. The upper portion 4 carries a number of equi-angularly disposed cam members; in the embodiments of FIGURES 1 to 5 six pivotally mounted cam members 5 are provided which swing in radial planes and have lower cam lobes 6 adapted to engage in a continuous locking recess 7 formed in the opening wall, whereas in the embodiment of FIGURES 6 and 7 twelve cam members 8 are slidably mounted on the portion 4 for such engagement.

On its cylindrical outer surface the lower portion 2 of the embodiments of FIGURES 1 to 5 has two grooves 9 and 10 in which are seated O-rings 12 and 13 for sealing relatively to the opening, and the upper groove 9 is oversize to provide a sampling annulus to detect leakage past the inner O-ring 13. This sampling annulus communicates with a sampling bore 14 in the lower portion 2. In the embodiment of FIGURES 6 and 7 only a single groove and O-ring are provided which correspond to the groove and O-ring 10 and 13 and are similarly referenced; no sampling bore being present.

In the embodiment of FIGURES 1 and 2 the lower portion 2 is closed to provide a complete seal and the upper portion 4 is of composite form, comprising an outer annular ring 15 carrying the cam members 5 and seated on and fixed to a central section 16. Through this section 16 the upper portion 4 engages telescopically with an annular intermediate portion 17 which in turn engages telescopically with the lower portion 2, these telescopic engagements being such as to allow said limited degree of relative movement between the upper and lower portions 4 and 2. A sampling pipe 18 projects upwardly from the lower portion 2 and communicates with the sampling bore 14 in the latter, and this pipe 18 passes with clearance through a vertical bore in the section 16.

The intermediate portion 17 has side apertures 19 receiving the cam members 5 and from which they project to engage the locking recess. These apertures have upper and lower downwardly and outwardly inclined cam surfaces, such as 20 and 22 respectively, the upper of which engage the cam lobes 6 as the upper and lower portions 4 and 2 move apart to displace the cam members 5 laterally inwards to clear the wall of the standpipe 1 as shown in the lefthand half of FIGURE 2, and the lower of which engage the lobes 6 as the portions move together during fitting to displace the cam members 5 laterally outwards into engagement with the locking recess 7 as shown in the righthand half of FIGURE 2. Each of the lower cam surfaces 22 terminates in a continuous cylindrical locking shoulder 23 formed on the intermediate portion 17 and which, when the upper and lower portions 4 and 2 have moved fully together, is engaged behind the cam lobes 6 to lock the latter in engagement with the locking recess 7 as in the righthand half of FIGURE 2.

The embodiment of FIGURES 3 to 5 has a lower portion 2 of annular form with a central aperture 24 through which passes remote handling means (not illustrated in full) for operation with the closure plug in position, so that the closure plug serves as a mounting for the handling means. It can in a similar manner serve as a mounting for any other form of equipment which has to project into the pressure vessel. A body member 25 of the handling means has a lower reduced diameter portion 26 seated within an upstanding cylindrical flange 27 of the lower portion 2 and is sealed relatively to the latter by two concentric O-rings 28 housed in grooves 29 and 30 in the lower portion 2 disposed laterally inwardly of the flange 27. The outer groove 29 is oversize to provide a sampling annulus in which the aforesaid sampling bore 14 terminates, and this annulus communicates with a sampling channel 32 formed in the body member 25.

In this case there is no intermediate portion and the upper portion 4 comprises a sleeve with an inwardly directed flange 33 at its lower end which engages loosely on the reduced diameter portion 26 and abuts an inclined shoulder 34 at the upper end of this portion to limit the relative axial movement of the upper and lower portions 4 and 2. The flange 33 has six cut-out slots such as 35 in which the cam members are mounted, and the upper edge of the flange 27 of the lower portion 2 presents a downwardly and outwardly inclined cam surface 36 which engages the cam lobes 6 as the portions 4 and 2 move together to displace the cam members 5 laterally outwards into engagement with the locking recess 7. At its outer edge this cam surface 36 terminates in a cylindrical locking shoulder 37 which, when the portions 4 and 2 have moved fully together, is engaged behind the cam lobes 6 to lock the cam members 5 in engagement with the locking recess 7, as in FIGURE 4.

As the upper and lower portions 4 and 2 move apart during removal of the plug, the upper end of the cam members 5 ride outwardly along the inclined shoulder 34 on the body member 25 to displace and retain the cam members 5 laterally inwards into a position in which they clear the wall of the standpipe 1.

In both the embodiments described in detail above the cam members 5, as shown more clearly in FIGURE 5, are formed with integral pivot pins 38 which engage in an annular groove 39 in the portion 4. The locking recess 7 is in each of these cases of truncated V form with an upper edge surface 40 complementary to upper surfaces 6a of the cam lobes 6 when the latter are in their locked positions, and the lower portion 2 is provided with a downwardly and outwardly inclined abutment surface 42 which is complementary to and engaged with lower surfaces 6b of the cam lobes 6 when in the locked positions.

The remaining embodiment of FIGURES 6 and 7, which is of somewhat simpler though generally similar form to the arrangement just described, also has the upper portion 4 in the form of a sleeve with an inwardly directed flange 43 at its lower end. The flange 43 engages loosely on a reduced diameter portion 44 of the lower portion 2 which is of generally cylindrical form extending through the portion 4, and abuts a shoulder 45 at the upper end of this portion to limit the relative axial movement of the upper and lower portions 4 and 2. The flange 43 has twelve cut-out slots such as 46 in which the cam members 8, which are of simple generally sector shape, are slidably mounted.

At each end the cam members 8 have projecting tongues such as 47 inclined at an angle of 45° to the plug axis. These tongues are received in corresponding grooves 48 machined in the sides of the slots 46, so that the member 8 can slide relatively to the portion 4 with a component of movement laterally of the plug. To enable assembly to be carried out the portion 2 is of composite form, being split horizontally (in a manner not illustrated) across the reduced diameter portion 44.

The upper edges of the grooves 48 present outwardly inclined cam surfaces which engage the tongues 47 as the portions 4 and 2 move together during fitting of the plug, and thereby displace the cam members laterally outwards into engagement with the locking recess 7 as shown in the drawings. During such fitting the cam members 8 initially rest on the step provided at the lower edge of the reduced diameter portion 44 until the cam members 8 have moved laterally outwards sufficiently to clear this step so that they can drop over a cylindrical locking shoulder 49 formed on the portion 2. As illustrated, when the portions 4 and 2 have moved fully together the shoulder 49 engages behind the cam members 8 to lock them in engagement with the locking recess 7.

As the upper and lower portions 4 and 2 move apart during removal of the plug, the cam members 8 fall by their own weight downwardly and inwardly along the grooves 48 until they are received within the recess in the lower portion 2 provided by the reduced diameter portion 44, when they clear the wall of the opening in the standpipe 1.

In this third embodiment, the shoulder 3 against which the lower portion 2 seats during fitting is provided by a bottom wall of the locking recess 7, whereas in the other two embodiments it is formed inwardly of the recess in the axial direction. The upper edge surface 50 of the recess is in this case also complementary to the upper surfaces of the cam members 8, being horizontal for this purpose. A horizontal step 52 on the lower portion 2, adjoining the locking shoulder 49 forms an abutment surface corresponding to the surface 42 of FIGURES 4 and 5.

The locking recess 7 is in each case of such width and so arranged relatively to the shoulder 3 that with the lower portion 2 seated on the latter there is clearance within the groove 7 for the cam members 5 or 8 to move laterally outwards to ride over the locking shoulder 23, 37 or 49 as the upper and lower portions 4 and 2 move together. All three closure plugs described are lowered into position in the standpipe 1 suspended by their upper portions 4 so that gravity, acting on the lower portion 2, maintains these two portions fully apart with the cam members 5 or 8 restrained laterally inwards in a position to clear the wall of the opening in the standpipe 1.

After the lower portion 2 has seated in the opening on the shoulder 3, further lowering of the upper portion 2 allows the two portions 4 and 2 to move together, whereupon the appropriate cam surface or surfaces urges the cam members 5 or 8 laterally outwards into engagement with the locking recess 7. This appropriate cam surface or surfaces is or are the surface 22 formed on the intermediate portion 17 in FIGURES 1 and 2, the surface 36 formed on the lower portion 2 in FIGURES 3 and 4, or the upper edges of the slots 48 in the upper portion 4 in FIGURES 6 and 7. The cam members 5 or 8 finally ride over the locking shoulder 23, 37 or 49 so that, when the upper and lower portions 4 and 2 have moved fully together and the total weight of the plug is carried by the shoulder 3, the cam members 5 or 8 are positively locked in engagement with the locking recess 7.

When the portions 2, 4 and 17 of the plug of FIGURES 1 and 2 have moved fully together, so that the fitting is "safe," the top of the upper portion 4 is flush with the top of the intermediate portion 17 to provide a visual indication of safety. With any of the embodiments other means may be provided to give local or remote indication of safety when the fitting is fully locked.

On the vessel to which the standpipe 1 leads being subjected to normal internal pressure the latter acts on the lower portion 2 and raises the plug bodily until the upper surface 6a of each cam lobe 6 or the upper edge of each cam member 8, as the case may be, engages the upper edge surface of the locking recess 7 i.e. the surface 40 or 50, so that the cam members 5 or 8 are trapped between this edge surface of the recess and the abutment surface 42 or 52 of the lower portion 2. These two surfaces between which the cam members 5 or 8 are trapped are parallel and coaxial so that no reaction is produced tending to disengage or eject the cam members 5 or 8 from their locked position. As long as the internal pressure is sufficient to keep the lower portion 2 raised from its seating on the shoulder 3 the closure plug cannot be removed from the opening.

If it is desired to remove the closure plug, the pressure difference across the plug must be dropped to a value which allows it to sink back on to its seating on the shoulder 3 whereupon the plug can be lifted out by means of the upper portion 4. The plug of FIGURES 1 and 2 has the central section recessed and fitted with a cross pin 53 for the attachment of a grab hook during lifting; the lifting arrangements of the other two plugs are not illustrated. During a first part of the lifting process the upper portion 4 moves relatively to the lower portion 2, which remains seated in the opening, and such relative movement raises the cam members 5 or 8 above the locking shoulder 23, 37 or 49 and causes lateral inward movement of the cam members over this locking shoulder and out of the locking recess 7 until they clear the wall of the opening in the standpipe 1. When the upper and lower portions 4 and 2 have moved fully apart the plug can be lifted bodily out of the opening.

With an arrangement such as the second embodiment illustrated in FIGURES 3 to 5, in which the closure plug provides a mounting for equipment projection into the vessel, a smaller radial clearance between the equipment and the opening will suffice than has hitherto been the case with plugs embodying separate locking means. This results from the fact that a closure plug according to the invention can be constructed to occupy a much smaller effective annular volume.

I claim:

1. A closure device for closing a passageway having an inner and an outer end and provided with a peripheral groove, said device comprising an inner closure portion having an inner surface facing said inner end, a central portion and an outer surface facing said outer end, an outer closure portion carried on the outer side of said inner closure portion for limited movement toward and away from said inner closure portion, cam members carried by one of said closure portions outwardly of the central portion of said inner closure portion for radial movement relative to said closure portions, an inclined cam surface carried by one of said closure portions outwardly of the central portion of said inner closure member and positioned to engage and radially project said cam members partially into said groove as said portions are brought together but permit said cam members to leave said groove as said closure portions are separated, said cam members having portions which project over said cam surface at all times, and the portions of said cam members projecting into said groove having axial dimensions less than that of said groove so as to permit said cam members to move in said groove between a position against the outer edge of said groove and one removed therefrom, and a locking surface carried by said closure device outwardly of the central portion of said inner member and positioned, when said closure portions are together and said cam members are adjacent said outer groove edge, to hold said cam members jammed in a stationary position between said locking surface and outer groove edge athwart the outward path of travel of said inner closure portion, thus blocking outward movement of said inner closure portion, so that said closure device can then be opened only after inward movement of said inner closure portion.

2. A closure device as claimed in claim 1 in which said cam members are pivotally attached to one of said cover portions.

3. A closure device as claimed in claim 1 in which said cam members are slidably mounted on one of said cover portions.

4. A closure device as claimed in claim 1 in which said inner closure portion comprises an upwardly projecting ring on its outer side, and an intermediate closure portion is axially slidable on said ring, said locking surface being carried on said intermediate closure member.

5. A closure device as claimed in claim 1 in which said inner closure portion is dimensioned to fit across and close said passageway and said outer closure portion is provided with means for lifting said closure device out of said passageway.

6. A closure device as claimed in claim 1 in which said passage is vertical with its outer end up and said cam means fall out of said groove under the force of gravity unless positively retained thereon.

7. A closure device for closing a passageway having an inner and an outer end and provided with a peripheral groove, said device comprising an inner closure portion having an inner surface facing said inner end, and an outer surface facing said outer end, an outer closure portion carried on the outer side of said inner closure portion for limited movement toward and away from said inner closure portion, cam members mounted on said outer closure portion for radial movement relative thereto, mounting means connecting said cam means to said outer closure portion which prevent axial movement of said outer closure portion when said cam means are stationary, an inclined cam surface on the outer side of said inner closure portion positioned to engage and radially project said cam members partially into said groove as said portions are brought together but permit said cam members to leave said groove as said closure portions are separated, said cam members having portions which project over said cam surface at all times, and the portions of said cam members projecting into said groove having axial dimensions less than that of said groove so as to permit said cam members to move in said groove between a position against the outer edge of said groove and one removed therefrom, and a locking surface carried by the outer side of said inner closure portion and positioned, when said closure portions are together and said cam members are adjacent said outer groove edge, to hold said cam members jammed in a stationary position between said locking surface and outer groove edge athwart the outward path of travel of said inner portion, thus blocking outward movement of both said closure portions, so that said closure device can then be opened only after inward movement of said inner portion.

8. A closure device for closing a passageway having an inner and an outer end and provided with a peripheral groove, said device comprising an inner closure portion having an inner surface facing said inner end, a central portion and an outer surface facing said outer end, an outer closure portion carried on the outer side of said inner closure portion for limited movement toward and away from said inner closure portion, cam members carried by one of said closure portions outwardly of the central portion of said inner closure portion for radial movement relative to said closure portions, an inclined cam surface carried by the other of said closure portions outwardly of the central portion of said inner closure member and positioned to engage and radially project said cam members partially into said groove as said portions are brought together but permit said cam members to leave said groove as said closure portions are separated, said cam members having a radial dimension greater than that of said groove and portions which project over said cam surface at all times, the portions of said cam members projecting into said groove having axial dimensions less than that of said groove so as to permit said cam members to move in said groove between a position against the outer edge of said groove and one removed therefrom, and a locking surface carried by said closure device outwardly of the central portion of said inner member and positioned, when said closure portions are together and said cam members are adjacent said outer groove edge, to hold said cam members jammed in a stationary position between said locking surface and outer groove edge athwart the outward path of travel of said inner closure portion, thus blocking outward movement of said inner closure portion, so that said closure device can then be opened only after inward movement of said inner closure portion.

References Cited in the file of this patent

UNITED STATES PATENTS

| | | |
|---|---|---|
| 2,037,347 | Shoop | Apr. 14, 1936 |
| 2,183,282 | Rike | Dec. 12, 1939 |
| 2,302,653 | Lebus | Nov. 17, 1942 |
| 2,887,124 | Mehl | May 19, 1959 |
| 2,967,640 | Roberts | Jan. 10, 1961 |